United States Patent [19]
Kristol et al.

[11] Patent Number: 5,799,092
[45] Date of Patent: Aug. 25, 1998

[54] SELF-VERIFYING IDENTIFICATION CARD

[75] Inventors: David M. Kristol, Summit; Lawrence P. O'Gorman, Madison, both of N.J.

[73] Assignee: Lucent Technologies Inc., Murray Hill, N.J.

[21] Appl. No.: 395,547

[22] Filed: Feb. 28, 1995

[51] Int. Cl.$^6$ .................................................. H04L 9/00
[52] U.S. Cl. .............................. 380/51; 380/4; 380/23
[58] Field of Search ........................... 380/23, 25, 51, 380/4, 49

[56] References Cited

U.S. PATENT DOCUMENTS

| | | | |
|---|---|---|---|
| 4,737,859 | 4/1988 | Van Daele | 358/296 |
| 4,991,205 | 2/1991 | Lemlson | 380/5 |
| 4,993,068 | 2/1991 | Piosenka et al. | 380/23 |
| 4,999,065 | 3/1991 | Wilfert | 156/64 |
| 5,157,424 | 10/1992 | Craven | 346/160 |
| 5,241,600 | 8/1993 | Hillis | 380/23 |
| 5,259,025 | 11/1993 | Monroe et al. | 380/23 |
| 5,268,963 | 12/1993 | Monroe et al. | 380/23 |
| 5,321,751 | 6/1994 | Ray et al. | 380/23 |
| 5,321,765 | 6/1994 | Costello | 382/4 |
| 5,337,358 | 8/1994 | Axelrod et al. | 380/23 |
| 5,351,302 | 9/1994 | Leighton et al. | 380/30 |
| 5,384,846 | 1/1995 | Berson et al. | 380/23 |
| 5,420,924 | 5/1995 | Berson et al. | 380/23 |
| 5,436,970 | 7/1995 | Ray et al. | 380/23 |
| 5,469,506 | 11/1995 | Berson et al. | 380/23 |
| 5,598,474 | 1/1997 | Johnson | 380/23 |

*Primary Examiner*—David C. Cain

[57] ABSTRACT

A self-verifying identification card having an image area which may contain a portrait, a finger print, a retinal image, or all of these together with an image signature which is derived from scanned intensity measurements taken from the image area. In the verification process, the image is scanned and aligned with respect to reference points corresponding to the original printing process which created the card, and intensity values, their averages, or any other function are compared to information provided by the image signature. Mathematical transformations, such as a one-way hash, an encryption, a compression algorithm, or a truth table may be used to encode the image signature. Alignment markers aid in scanning the image and the image signature. The use of average values aids in reducing noise and the use of comparison functions makes the process less sensitive to variations among scanners. The verification may be done at the point of a transaction, for a standalone system, or may be referred to a centralized data base in a networked system for further inquiry. In a networked system the image signature may be stored in the database.

25 Claims, 3 Drawing Sheets

5,799,092

SELF-VERIFYING IDENTIFICATION CARD

BACKGROUND OF THE INVENTION

CROSS REFERENCE TO RELATED APPLICATION

This application is related to another U.S. patent application, Ser. No. 08/395,547, now U.S. Pat. No. 5,668,874, entitled "Identification Card Verification System and Method" (Kristol 3–13), with this application being concurrently filed with the present application, having the same inventors, and being incorporated herein by reference.

1. Field of the Invention

This invention relates to an identification card, and in particular to one which carries information which is used to verify that there have been no alterations to the card.

2. Description of Related Art

The use of identification cards is proliferating in commercial transactions such as check cashing and credit cards, security applications to gain access to premises, licenses of various kinds, and passports, which may be considered one of the first uses of an identification card.

In structure, the cards usually contain a photograph of a person. Recently additional features are sometimes added such as a signature, fingerprint, or even the image of the person's retina. Each of these is a characteristic which is unique to each human being, and their addition reflects attempts to mitigate the possibility of forged identification cards. As greater reliance has been placed upon these cards, their value to unauthorized users and to unauthorized purveyors of false identification cards has also increased significantly. Counterfeiters routinely obtain or make passport and driver license blanks and affix a photograph for a small fee.

With the increased number and variety of identification cards, automated methods of their manufacture have been developed. U.S. Pat. No. 4,999,065 to Wilfert describes a method of transferring a video image of a person, signature, or fingerprint into digital form, adding data from a keyboard, and laser printing the composite.

U.S. Pat. No. 5,157,424 to Craven et al. teaches a method to superimpose a signature over a portrait wherein the signature is scaled in size and printed in a tone which is reverse to that of the portrait. So the signature would appear white if applied over dark hair. This is an example of a card which is harder to counterfeit.

U.S. Pat. No. 4,737,859 to VanDaele shows a bi-level recording device which produces a composite half-tone record in which images of different subjects remain visually distinguishable. Digital information from the two images is fed into an EXOR gate which drives a print engine to produce a composite of a portrait and line work. This is quite similar to the previous patent.

U.S. Pat. No. 5,321,751 to Ray et al. describes a method and apparatus for credit card verification wherein a picture accompanies an application for the card. The picture information is converted into a digital image which is stored centrally or at the point of a transaction. The digital image is also stored in a medium like a magnetic stripe used by many cards or into an electronic storage system such as in "smart cards". At the point of sale the digital image of the presenter is converted to a video monitor display. The card administration agency also receives a verification request together with an identification code provided by the presenter which selects an algorithm to translate the stored digital information into a video display. In this invention the photograph is not on the card.

Accordingly, there is a need for an identification card which is self-verifying and which is accepted by a broad variety of scanners. The card's design and the verification process also need to be robust, in that the verification should be insensitive to noise caused by imperfections or dust on the card. In particular, it should be resistant to any attempt at tampering or counterfeiting.

SUMMARY OF THE INVENTION

The present invention relates to a self-verifying identification card and a method to provide it, and in particular to a card which carries information which is used to verify that there have been no alterations to the card. The verification can be made at the point of a transaction or by reference to a central data base.

In one embodiment of the invention, the identification card contains an image area which typically contains the photographic portrait of a human being. However, other characteristics which are unique to that person may also be used, such as: a fingerprint, a signature, or an image of the person's retina, or any combination of these. The card also contains an image signature, which is prepared from optical values sampled from or about selected reference points within the image area. The values may be taken from gray scale, color, or they may be taken from a mathematical transformation of the image, such as, a Fourier Transform. The card thus contains information on itself which indicates whether attempts have been made to substitute the image in the image area. For noise free and robust operation several optical values are determined in a cluster around each reference point and averaged. To accommodate the variations in commercial scanning devices which read the optical value, a functional relationship of the average optical value around a reference point to other optical values at reference points near the former one is used to create the image signature which is provided on the card.

In a further embodiment of the invention, a registration feature is designated on the identification card, described above, which provides information regarding the orientation of the card in the scanning device. The placement of the registration feature, or other indicia on the card, can also provide information regarding the selection of a mathematical translation function which may be used to translate the optical value information to an encoded format of the information on the card. The mathematical translation function may include: an encryption scheme, a one-way hash, a compression algorithm, or a truth table, used separately or in combination. These functions are well known in the art of computer science.

The invention also includes a method of preparing an identification card wherein optical value data derived from reference points within a representation of a human characteristic, such as a portrait, a fingerprint, a signature, or the image of a retina, are used to create an image signature, where both the representation and the image signature are affixed to the card. The image signature is derived from a function relating optical values, and it may be in a mathematically transformed format.

These and other features and advantages of the invention will be better understood with consideration of the following detailed description of the preferred embodiments taken in conjunction with the accompanying drawings.

The drawings are not to scale.

DETAILED DESCRIPTION OF THE PREFERRED EMBODIMENTS

Figure 1A:
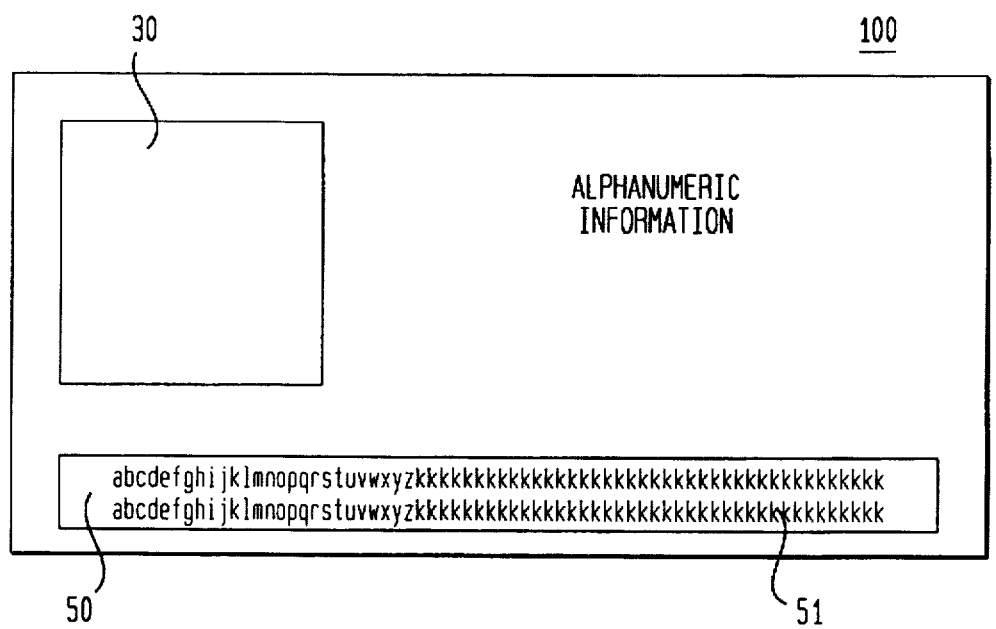
FIG. 1A. is a front view of a self-verifying identification card.
Figure 1B:
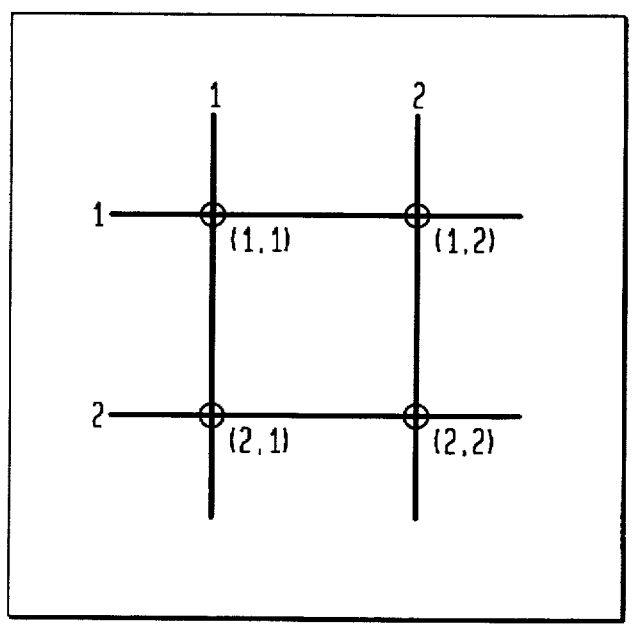
FIG. 1B shows a coordinate system for reference points within one area of the card.
Figure 1C:
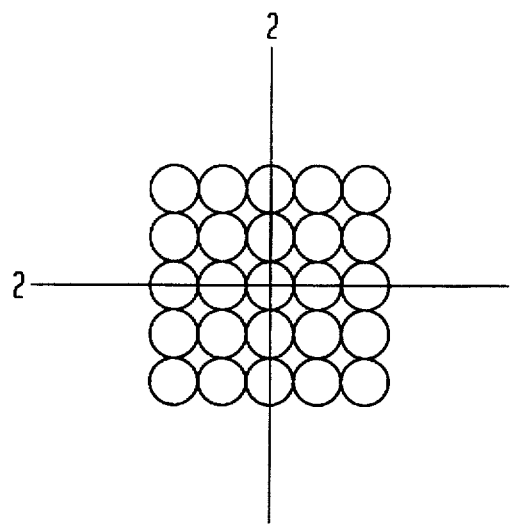
FIG. 1C shows a cluster of pixels which are sampled around a reference point.
Figure 1D:
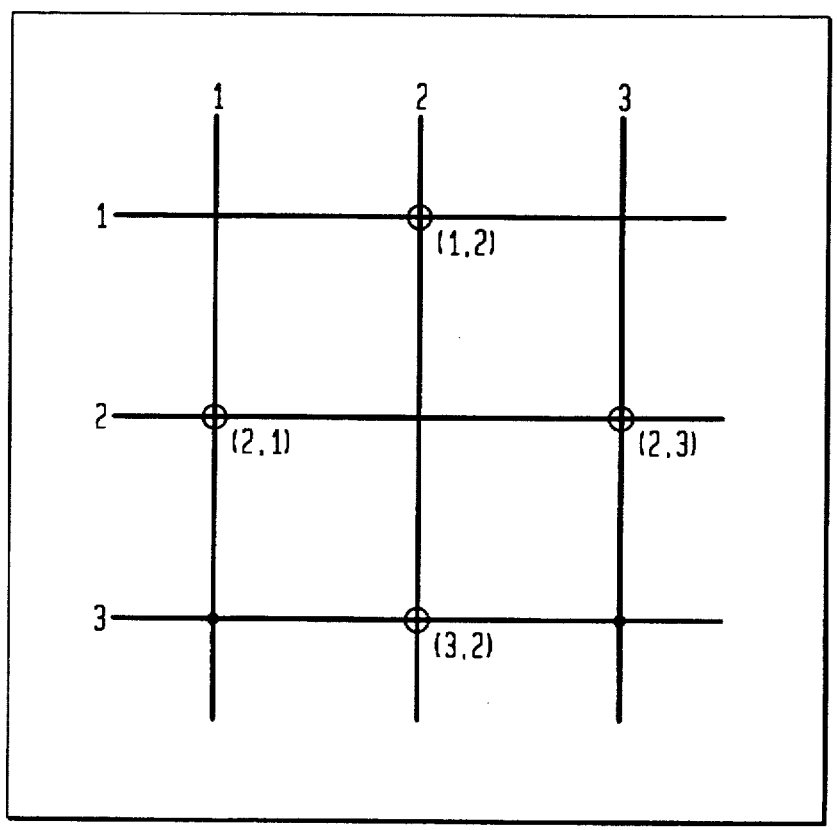
FIG. 1D shows nearest neighbor reference points surrounding a reference point.

Referring now to FIG. 1A, there is shown apparatus 100 in accordance with one embodiment of the invention which is an identification card having an image area 30 occupying a portion of the card. Also provided on the card is an area 50 containing an image signature 51. The remaining area of the card may be used for alphanumeric text which describes the issuer, type, and purpose of the card, together with any state seal or corporate logo. The image area typically contains a photographic portrait of a human being, but it could also contain a fingerprint, a signature, the image of the human's retina, or any combination of these. The image area is mathematically divided into a matrix of reference points which are more clearly shown in FIG. 1B. The matrix is constructed with a series of parallel horizontal and vertical lines labeled 1, 2, etc. in each direction. The intersection of the first horizontal and first vertical line determining reference point (1,1), and so on. To prepare the card, an image of a portrait, signature, fingerprint, or retinal image which is to be printed within the image area is scanned by devices which are well known in the art such as a Hewlet-Packard Scanjet or Logitech Scanner. These devices can read both the optical values in the image area and the characters or bar code in the image signature. A typical scanning resolution is 300 dots per inch (dpi) which is also typical of laser printer output. Each of the 300 dots being defined as a pixel. The optical value of whatever image is scanned is taken at each reference point, and commercial scanners provide gray scale or color values ranging from 0 to 250 in arbitrary units. To provide a more robust system which is less sensitive to noise which is created by dust or bubbles which can occur on the card or by noise in the scanning device, an array of optical values about each reference point may be taken and the values averaged to represent the optical value at the reference point. One such scheme is shown in FIG. 1C, where a 5×5 array is selected about reference point (2,2). Each of the dots being about 0.0033 inches in diameter for 300 dpi resolution. Reference point (2,2) may be separated from its nearest neighbors (1,2), (2,3), (3,2), and (2,1) by 0.1 inch or any other distance determined by the algorithm selecting the reference points. The nearest neighbors are indicated in FIG. 1D.

To accommodate the different gain characteristics of various printer models, experience has shown that a functional relationship describing the optical value at a reference point (or its average value as determined from an array such as shown in FIG. 1C) compared to other optical values in the image area, provides a value which is a more reliable and reproducible indicator of the optical value at the reference point. The functional relationship may be derived from any truth table which relates the optical value to others in the image area. It may also be the ratio of the value at a point to others in the image area. In a preferred embodiment, the optical value at a reference point is quantified into a three level function wherein optical values greater than, equal to, or less than surrounding optical values are ascribed values of "1", "0.5", or "0", respectively. The process is repeated for each reference point, and the series of values becomes the image signature which is imprinted on the card combined with any other information the card issuer wants. The information may further describe the cardholder and add items such as citizenship, corporate permission codes, health profiles, or financial details. This information may be in encrypted format anywhere on the card, but in a preferred embodiment it is placed within a specified area, such as area 50.

Figure 1E:
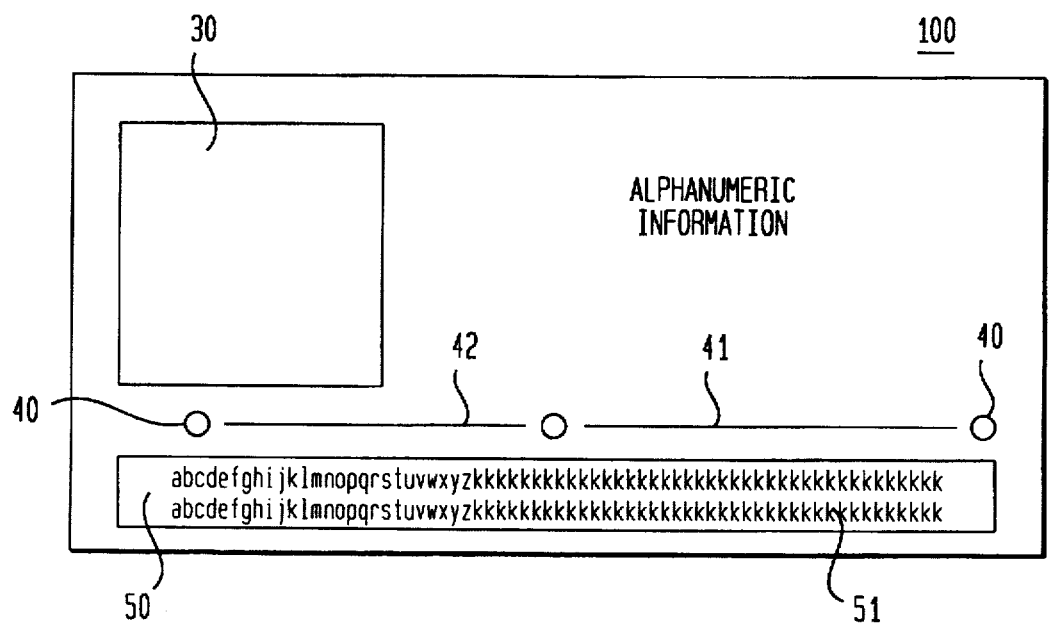
FIG. 1E shows another embodiment of the invention.

In FIG. 1E, registration features 40 may be used to determine the orientation, location, and scale of the card as it is inserted into a commercial scanner. They are shown as round dots approximately 0.1 inches in diameter which are easily recognized by the algorithm searching the digital information from the scanner. Preferably the alignment features are placed away from any axis of symmetry so that the orientation of the card is unmistakable. Other indicia 41 and 42 may also be added to the card and their length may indicate a different encryption scheme for each card, to add another level of security. The perimeter of the image area may also serve as a registration feature to orient and scale the card, and any alphanumeric character on the card, such as a particular letter in a person's name may be used as an indicator of a particular encryption function.

The result is a card which is self-verifying because any tampering with the image in the image area cannot correspond to the image signature containing optical values of the original image. By using the average of optical values of a cluster of pixels around each reference point, noise caused by dust or imperfections in the card or the scanner is reduced to provide a robust and reliable verification. By using a functional relationship to describe the optical value at one reference point compared with others in the image area, the card becomes less sensitive to the characteristics of commercial scanners.

The invention includes a method of preparing a self-verifying identification card wherein an image of a characteristic which is unique to each human being is optically scanned to determine the optical values at one or more reference points within an area containing the image. An image signature is then computed from the optical value at one or more reference points and the image of the characteristic and the image signature are affixed upon the identification card. The characteristic may be a photographic portrait, a signature, a fingerprint, a retinal image, or any combination of these. The optical value may be the average of several optical values measured around the reference point or it may be derived from the ratio of the average optical value at a reference point compared to the average of the optical value average values of selected reference points in the image area. The image signature may be derived from a ratio or from a truth table. In a preferred embodiment, a three level function compares the optical value at a point to that of nearby neighbors to obtain the image signature. Registration features may also be affixed or designated upon the identification card. The image signature may also be in a mathematically translated format, such as, a one-way hash function, an encryption scheme, a compression algorithm, or a truth table, used separately or in combination. These functions are well known in computer science. The selection of the format may be determined by indicia on the card for an added level of security The previously described embodiments of the invention provide advantages including a self-verifying identification card which is accepted by a broad variety of scanners and one which is compatible with a many picture based identification cards as they are renewed. The card and the verification process are insensitive to noise. The various functions which create the image signature and the mathematical transformations though which the image signature is recorded make the card and process resistant to tampering or counterfeiting.

Changes and modifications in the specifically described embodiments can be carried out without departing from the scope of the invention. In particular, the number and location of the reference points within the image area can be varied without departing from the spirit of the invention and the number of pixels used in determining an average optical value around each reference point can be varied.

We claim:

1. An identification card for identifying an individual comprising:

a card substrate;

an image area disposed on said card substrate, said image area containing a plurality of image points that produce a visible image of a characteristic that is unique to said individual, wherein each of said image points within said image has an optical value; and an image signature derived from optical values for predetermined reference points on said image, wherein optical values for each of said reference points are obtained by averaging optical values of image points proximate each of said reference points;

wherein said image is optically scannable from said card substrate and said image signature is readable from said card substrate for comparison to one another.

2. The identification card of claim 1 wherein said characteristic is selected from a group consisting of a photograph of the individual, a signature of the individual, a fingerprint of the individual and a retina pattern of the individual.

3. The identification card of claim 1 wherein the image signature is derived from a function relating the optical value at a reference point on said image to optical values at other points on said image within the image area.

4. The identification card of claim 1 wherein the image signature is in a mathematically transformed format upon the identification card.

5. The identification card of claim 3 wherein the function is a three-level function.

6. The identification card of claim 3 wherein the function is a ratio.

7. The identification card of claim 3 wherein the function is derived from a truth table.

8. The identification card of claim 4 wherein the mathematical transformation is determined by indicia on the card.

9. A self-verifying identification card for identifying an individual, comprising:

a card substrate;

an image area disposed on said card substrate, said image area containing a plurality of image points that produce a visible image of a characteristic that is unique to said individual, wherein each of said image points within said image has an optical value;

at least one reference point contained within said image;

an image signature disposed on said card substrate, said image signature being derived from optical values for said at least one reference point in the image area, wherein optical values for each of said reference points are obtained by averaging optical values of image points proximate said at least one reference point; and at least one registration feature disposed on said card substrate in a position which determines the orientation, location, and scale of the identification card.

10. The self-verifying identification card of claim 9 wherein the image signature is derived from a function relating the optical value at a reference point to other optical values within the image area.

11. The self-verifying identification card of claim 9 wherein the image nature is in a mathematically transformed format upon the identification card.

12. The self-verifying identification card of claim 10 wherein the function is a three-level function.

13. The self-verifying identification card of claim 10 wherein the function is a ratio.

14. The self-verifying identification card of claim 10 wherein the function is derived from a truth table.

15. The self-verifying identification card of claim 4 wherein the mathematical transformation function is determined from indicia on the card.

16. The self-verifying identification card of claim 9 wherein the characteristic is a portrait of a human being.

17. The self-verifying identification card of claim 16 wherein the registration feature is an edge of the image area.

18. A method of preparing a self-verifying identification card for identifying an individual comprising the steps of:

optically scanning an image of a characteristic which is unique to said individual, wherein said image contains a plurality of image points that each have an optical value;

determining an average optical value for at least one reference point within said image, wherein said average optical value is obtained by averaging optical values of image points proximate said at least one reference point;

computing an image signature from the average optical value of each said reference point; and positioning said image of the characteristic and the image signature upon the identification card.

19. The method of claim 18 wherein the characteristic is a portrait.

20. The method of claim 18 wherein the image signature is derived from a function relating the average optical value at each reference point to other optical values within the image area.

21. The method of claim 18 wherein the image signature is in a mathematically translated format.

22. The method of claim 20 wherein the function is a three-level function.

23. The method of claim 20 wherein the function is a ratio.

24. The method of claim 20 wherein the function is derived from a truth table.

25. The method of claim 21 wherein the mathematical translation is a one-way hash function.

* * * * *